United States Patent
Edelmann et al.

[11] Patent Number: 5,819,697
[45] Date of Patent: Oct. 13, 1998

[54] DRIVE UNIT WITH INTERNAL COMBUSTION ENGINE AND HYDRODYNAMIC RETARDER

[75] Inventors: Peter Edelmann, Heidenheim; Jurgen Friedrich, Crailsheim; Hans Gebhardt, Langenzenn; Heribert Moller, Sachsen; Alfred Neitz, Wendelstein; Klaus Vogelsang, Crailsheim, all of Germany

[73] Assignee: Voith Turbo GmbH, Heidenheim, Germany

[21] Appl. No.: 554,674

[22] Filed: Nov. 7, 1995

[30] Foreign Application Priority Data

Nov. 10, 1994 [DE] Germany ............... 44 40 163.9

[51] Int. Cl.⁶ .................................................. F02B 77/00
[52] U.S. Cl. ........................................ 123/198 R; 188/296
[58] Field of Search ....................... 123/198 R; 188/290, 188/296

[56] References Cited

U.S. PATENT DOCUMENTS

| | | | |
|---|---|---|---|
| 1,915,547 | 6/1933 | North et al. ........................... | 188/274 |
| 2,864,473 | 12/1958 | Christenson et al. .................. | 192/4 B |
| 3,124,218 | 3/1964 | Montgomery ......................... | 188/264 F |
| 3,335,823 | 8/1967 | Nagel .................................... | 188/296 |
| 3,490,567 | 1/1970 | Clark et al. ........................... | 123/320 |
| 3,631,949 | 1/1972 | Mazalov ................................ | 192/4 B |
| 3,650,358 | 3/1972 | Bessiere ................................ | 188/296 |
| 3,720,372 | 3/1973 | Jacobs .................................. | 237/12.3 B |
| 3,794,001 | 2/1974 | Birch et al. ........................... | 123/41.49 |
| 3,952,508 | 4/1976 | Bopp .................................... | 60/330 |
| 4,405,038 | 9/1983 | Ternehall ............................... | 192/4 B |
| 4,922,872 | 5/1990 | Nogami et al. ........................ | 123/319 |
| 5,657,723 | 8/1997 | Edelmann et al. ..................... | 123/41.31 |

FOREIGN PATENT DOCUMENTS

| | | |
|---|---|---|
| 19 29 484 | 6/1969 | Germany . |
| 19 46 167 | 5/1970 | Germany . |
| 17 80 730 | 5/1978 | Germany . |
| 3301560 C1 | 4/1984 | Germany . |
| 3713580 C1 | 11/1988 | Germany . |
| 2 063 420 | 6/1981 | United Kingdom . |

*Primary Examiner*—Noah P. Kamen
*Attorney, Agent, or Firm*—Baker & Daniels

[57] ABSTRACT

The present invention involves a drive unit, specifically a drive unit for a motor vehicle having an internal combustion engine, a cooling system with fan and a hydrodynamic retarder with a stator, rotor and housing. The retarder is located within a space bounded on one side by the front of the crankcase, on a second side by the fan shaft which runs parallel to the engine shaft, and on a third side by the rear edge of the fan wheel. Viewed from the front, the retarder is substantially located within the fly circle of the fan wheel whereby the air flow generated by the fan wheel removes heat, generated by braking actions, from the housing of the retarder.

1 Claim, 6 Drawing Sheets

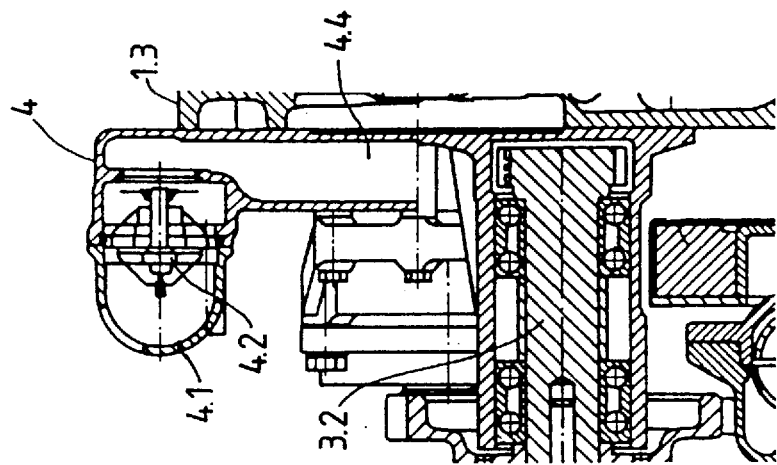
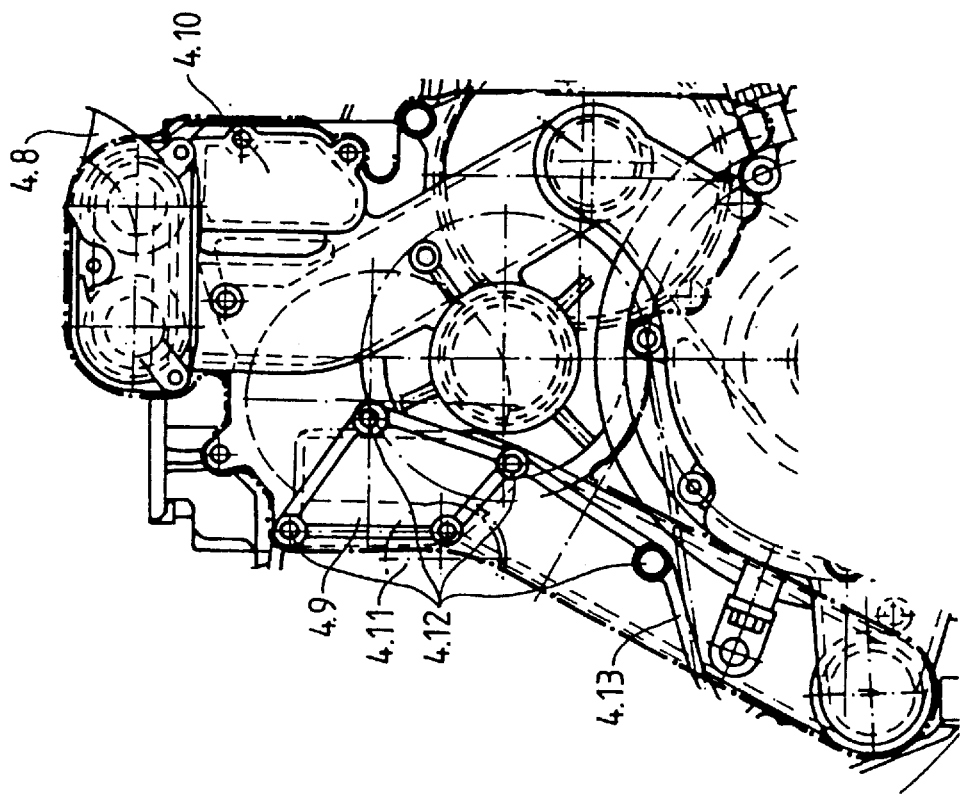

DRIVE UNIT WITH INTERNAL COMBUSTION ENGINE AND HYDRODYNAMIC RETARDER

BACKGROUND OF THE INVENTION

1. Field of the invention.

The present invention relates to a drive unit, and, more particularly, to a drive unit for a motor vehicle having an internal combustion engine with a cooling system having a fan and a hydrodynamic retarder having a stator, a rotor and a housing. Such a drive unit is known from DE 37 13 580 C1.

2. Description of the related art.

Retarders are primarily employed in heavy vehicles to absorb and convert to heat the kinetic braking energy which accrues most notably during high speed braking actions (adaptation braking). Retarders are also well suited for situations involving sustained braking, for example, maintaining a constant speed of 30 km/h on an incline of 7%. Oil normally serves as the operating fluid. The heat transferred in the retarder to the operating fluid must be delivered, by means of a specific heat exchanger, to a coolant or the ambient air.

U.S. Pat. No. 3,720,372 discloses a retarder which in one embodiment is powered by the crankshaft and constantly flooded by the coolant of the cooling system. The rotor of the retarder serves as circulating pump directing heated coolant to a heater core within the passenger compartment of the automobile. The purpose of this system is to heat the coolant by means of the retarder and thereby heat the passenger compartment. There is also a control system arranged on the retarder which controls the distribution of the coolant depending on its temperature.

Also known, from DE-PS 33 01 560, is a retarder which, by way of a clutch, is connected to the crankshaft of the drive engine and to the driven wheels of the vehicle. It is not the purpose of this retarder, however, to absorb the high kinetic braking energy of the vehicle and convert it to heat. Instead, the retarder is operated exclusively as a heater, with the available operating energy input controlling the heating output. The coolant of the engine also serves as the operating fluid of the retarder.

A retarder known from DE-AS 1 946 167 (U.S. Pat. No. 3,650,358) is powered by the crankshaft of an internal combustion engine whose coolant also serves as the operating fluid for the retarder. The advantage of this mode of operation is that the accruing heat develops directly in the coolant passed to the radiator and a heat exchanger between the two fluids is unnecessary.

The rotor is mounted on an antifriction bearing and the seal between the frame and rotor shaft is established by two lip seals.

It is desirable to keep the overall axial dimensions and weight of the drive units of this type as low as possible, especially when the drive unit will be used in a motor vehicle. The drive units known heretofore have failed to satisfy this goal.

SUMMARY OF THE INVENTION

The objective underlying the present invention is to fashion a motor vehicle drive unit having an internal combustion engine with a cooling system which utilizes a fan and a hydrodynamic retarder having a stator, a rotor and a housing such that the overall axial dimensions and weight of the drive unit will be less than prior art drive units.

The present invention, in attainment of the desired objectives, provides a retarder which is placed in front of the internal combustion engine, in the space between the fan and crankcase which, for a typical internal combustion engine, does not require significant modification of existing designs.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 is a frontal elevation of an intermediate body located between the crankcase and the retarder;

FIG. 6 is a detailed enlargement of a portion of FIG. 1;

DETAILED DESCRIPTION OF THE INVENTION

Figure 1:
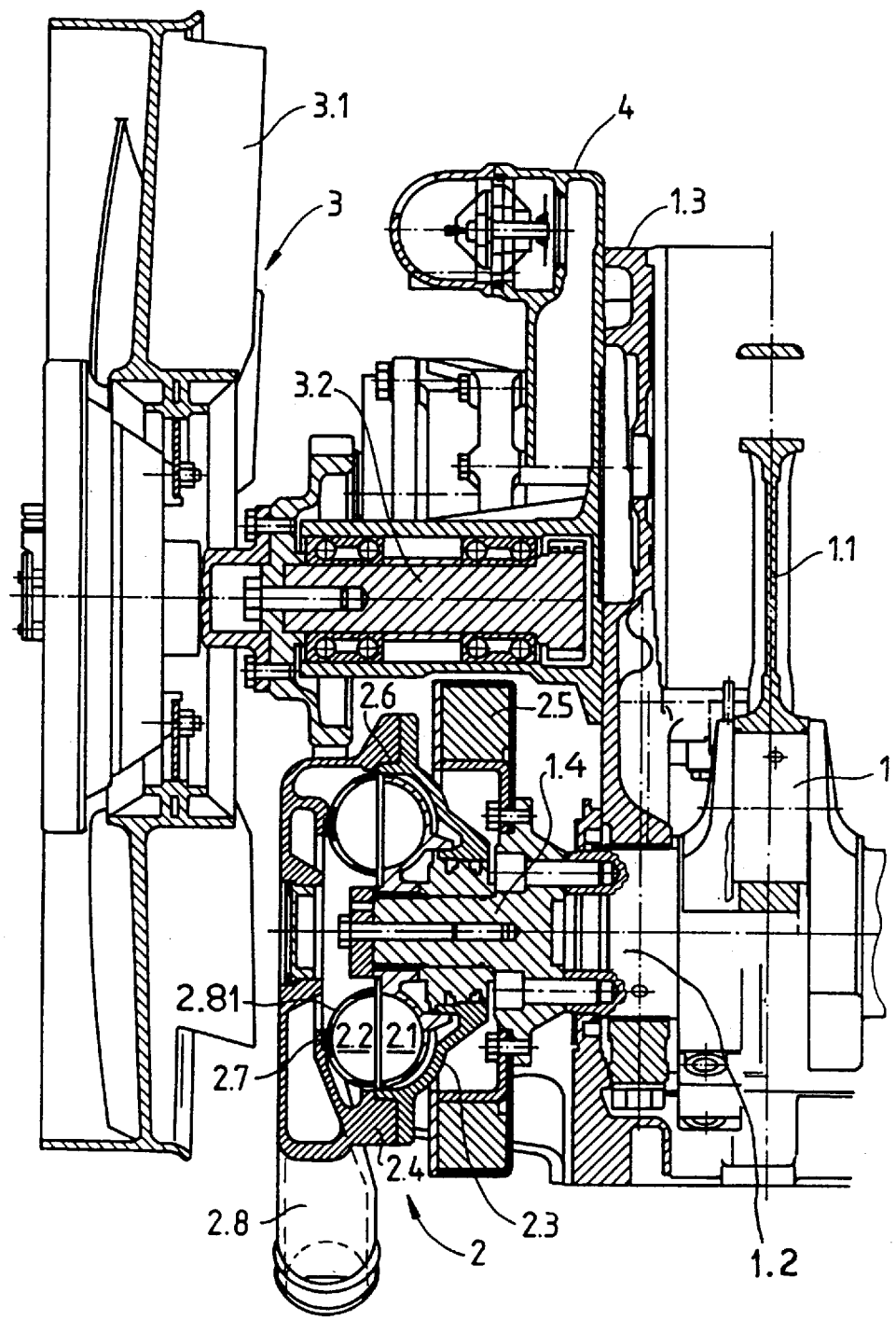
FIG. 1 is a an axial section of a drive unit taken along line A—A in FIG. 2.

Referring now to the drawings and particularly to FIG. 1, there is shown a partial view of an internal combustion engine having a crankshaft 1, a connecting rod 1.1, a crankshaft journal 1.2 screwed to the end of the crankshaft 1 and a crankcase 1.3.

Located to the left of crankcase 1.3, in FIG. 1, are a retarder 2 and fan 3.

The retarder 2 features a rotor impeller wheel 2.1 and a stator impeller wheel 2.2. The rotor impeller wheel is mounted in a cantilevered fashion on the crankshaft journal 1.2. By using a rotor mounted in a cantilevered fashion, one or more separate bearings for the retarder rotor, otherwise required, can be eliminated. The retarder features a housing which is structured of a bell 2.3 surrounding the rotor impeller wheel and a cover body 2.4. The crankshaft journal 1.2 also supports a damper device 2.5 joined to the crankshaft journal 1.2 in a rotationally fixed fashion. Although a vibrational damper is normally permanently joined to the rotor of a retarder, an advantage of the present invention is that the damper may be reduced in size or entirely eliminated.

The fan 3 is rotated by the crankshaft 1 by way of a gearset which is only partially illustrated. As can be seen, the fan shaft 3.2 extends parallel to the crankshaft journal 1.2.

Figure 2:
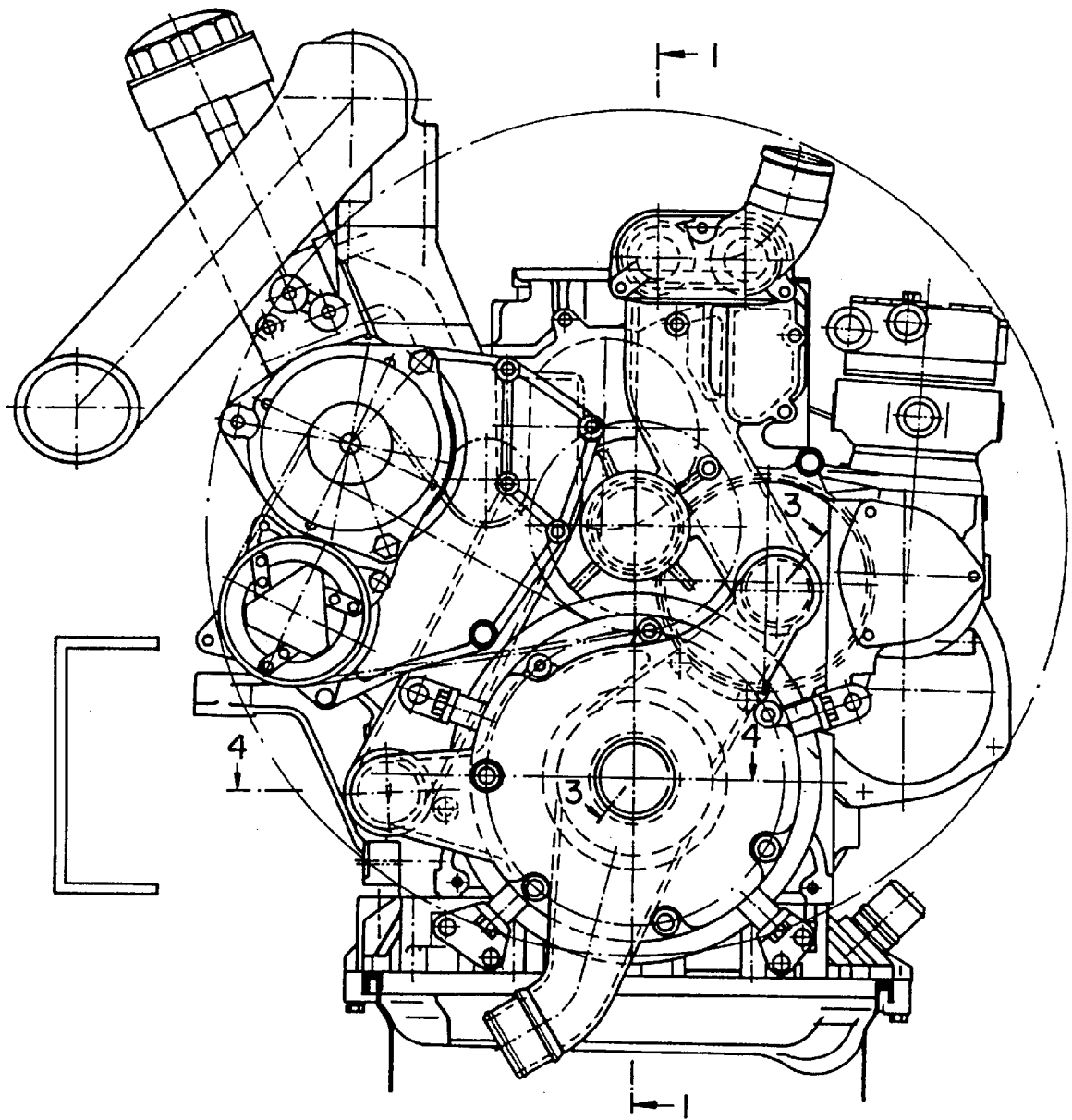
FIG. 2 is a frontal elevation of the drive unit with the fan wheel removed and the fly circle of the fan wheel indicated by a dash-dot line.

The retarder 2 is arranged so that it occupies virtually the entire space bounded on one end by the crankcase 1.3 or the gearset driving the fan 3, on a second side by the fan shaft 3.2 and on a third side by the rear edge of the fan wheel 3.1. The retarder 2 with the cover body 2.4 is also contained within a projection, along fan shaft 3.2, of the fly circle of the fan wheel 3.1. The fly circle projection being shown in FIG. 2 by a dash-dot line. Thus, the retarder takes optimal advantage of the space available.

A very significant advantage of placing retarder 2 in the space between crankcase 1.3, fan shaft 3.2 and fan wheel 3.1 is that the air flow generated by the fan wheel 3.1, due to the spatial proximity between fan wheel 3.1 and retarder 2, removes heat generated by braking actions from the outside surfaces of the retarder 2. Thus, the load placed upon the heat exchanger coordinated with the retarder is significantly reduced.

By locating the retarder 2 directly in front of the engine (which is the cooler side of the engine), the mass of water contained between retarder inlet and radiator, the mass of the engine oil and the metal mass of the cooling system including the engine, can be utilized for capacitive energy absorption. Thus, the retarder of the present invention has a greater capacity to absorb energy. This is particularly advantageous when braking actions create energy more rapidly than the radiator can permanently transfer.

The compact arrangement of the present invention also minimizes the length of the required piping. The problems created by the relatively long piping paths required in conventional drive units are thereby minimized.

Figure 3:
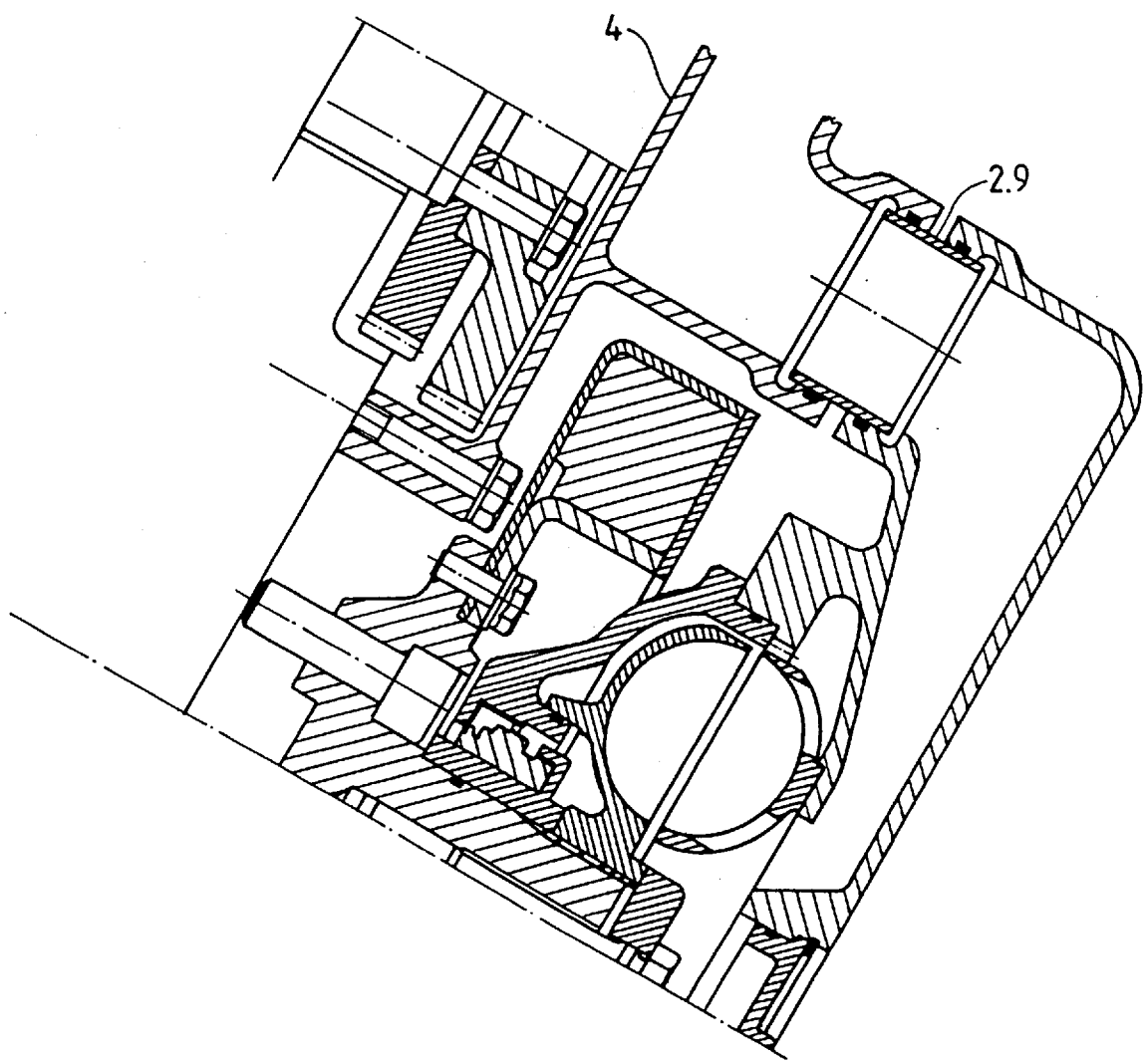
FIG. 3 is a sectional view along line B—B in FIG. 2.
Figure 4:
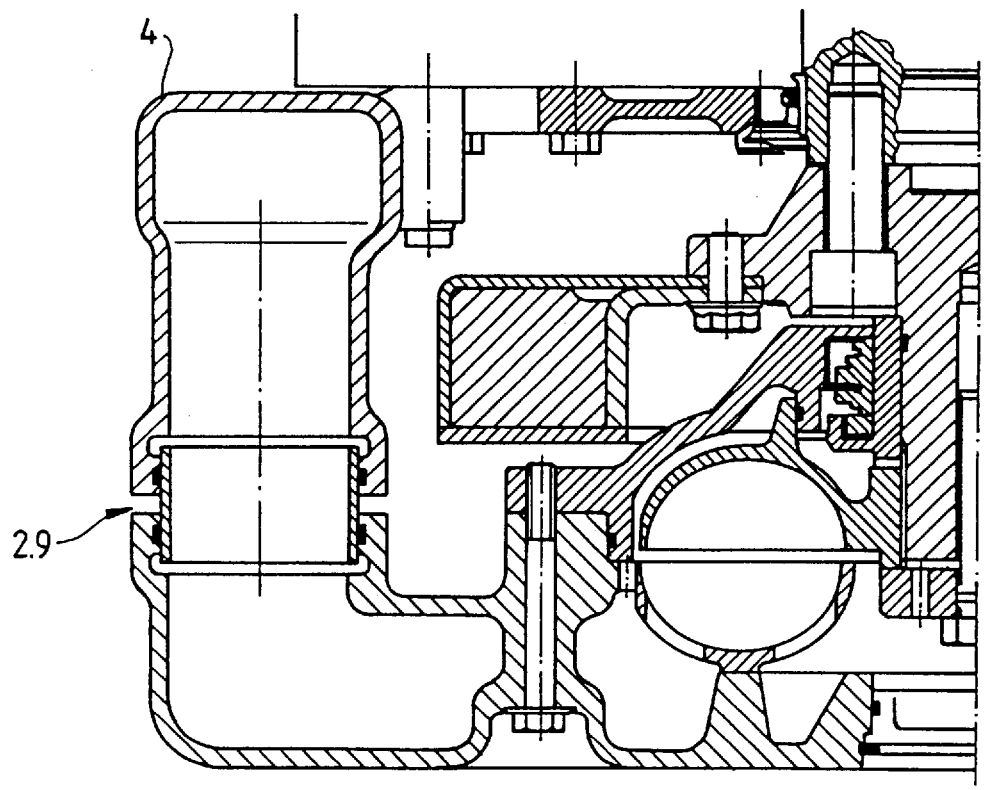
FIG. 4 is a sectional view along line D—D in FIG. 2.

The cover body 2.4, see FIG. 1, forms part of the retarder housing by enclosing the stator impeller wheel 2.2 and also serves several additional functions. In the illustrated embodiment, a single combined operating and cooling medium is utilized by retarder 2 (typically referred to as a water pump retarder). The cover body 2.4 is a hollow body which forms a collecting chamber with three ports, two inlets and one outlet, and draws cooling water from the vehicle radiator. One of the ports, 2.8, is shown in FIG. 1 while the other two, 2.9, are illustrated in FIGS. 3 and 4. The cover body 2.4 bears upon the crankcase 1.3, or another fixed part of the engine, thereby forming a torque multiplier. The cover body 2.4 is attached to the rotor housing 2.3 by a slip-on joint as illustrated by the cylindrical locating surface 2.6. In addition to supporting rotor housing 2.3, the cover body 2.4 also centers the rotor housing 2.3 with the mechanical seal between the rotor housing 2.3 and crankshaft journal 1.2.

The stator impeller wheel 2.2 rests upon faying surfaces 2.7 and is supported by the cover body 2.4. The stator impeller wheel 2.2 is attached to the cover body 2.4 by a slip-on joint. Cutouts 2.81 are located in the back wall of stator impeller wheel 2.2 and allow the exchange of fluids between the working space of the retarder and the interior of cover body 2.4.

Numerous advantages are derived from the cover body 2.4 of the present invention. Most importantly, the cover body 2.4 contributes to the compact nature of the design. The cover body 2.4 also provides a service-friendly drive unit by enabling access to all major parts when the fan wheel 3.1 and cover body 2.4 are removed.

While a separate crankshaft journal 1.2 is illustrated in the Figures, it is also possible to mold the crankshaft journal 1.2 to the crankshaft 1. The crankshaft journal 1.2 and crankshaft 1 are then formed by a single component.

FIGS. 3 and 4 depict major components of the retarder. Specifically, FIGS. 3 and 4 illustrate how the piping ports are attached to cover body 2.4 in a slip-on fashion. It is also possible to construct the stator impeller wheel 2 and cover body 2.4 as a unitary part.

As is evident from the description above, the rotor 2.1 of the retarder 2 is preferably mounted in a cantilevered fashion and supported by the crankshaft bearing.

The present invention also provides an intermediate body 4. The intermediate body 4 is mounted on the crankcase 1.3 between crankcase 1.3 and fan 3. Intermediate body 4 also directly borders the cover body 2.4 and thereby centers housings 2.3 and 2.4 of retarder 2. A complete fan assembly 3 including fan shaft 3.2 and impeller wheel 3.1 is supported by intermediate body 4 and additional elements, such as thermostats, can also be supported by the intermediate body 4.

The outline of the intermediate body is indicated by heavy dash-dot lines in FIG. 5. Also shown in FIG. 5 is an inlet port 4.9 which allows coolant to enter the engine and a crankcase outlet port 4.10. Coolant is directed towards the radiator through outlet port 4.8. An idler pulley 4.11 is provided for cooperation with a drive- or V-belt for auxiliary units. A console 4.13 which supports auxiliary units is secured at attachment points 4.12.

FIG. 6 is a cross-sectional view showing only that area of FIG. 1 which surrounds the fan shaft 3.2. Thermostat housing 4.1, thermostat 4.2 and their relationship to intermediate body 4 and crankcase 1.3 are shown in FIG. 6. A duct 4.4 which serves as a short-circuit fluid connection to retarder 2 is also shown in FIG. 6.

Figure 7:
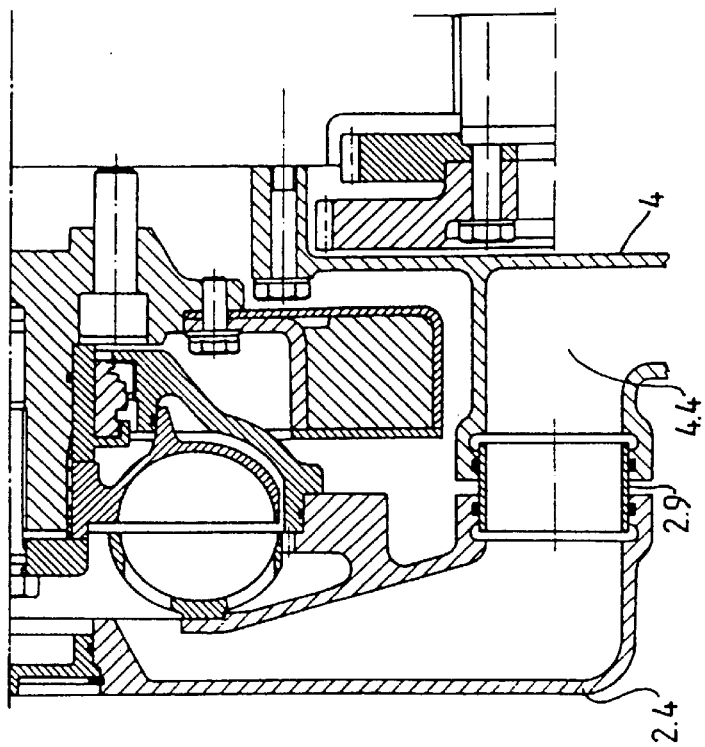
FIG. 7 is a detailed enlargement of a portion of FIG. 1.
Figure 8:
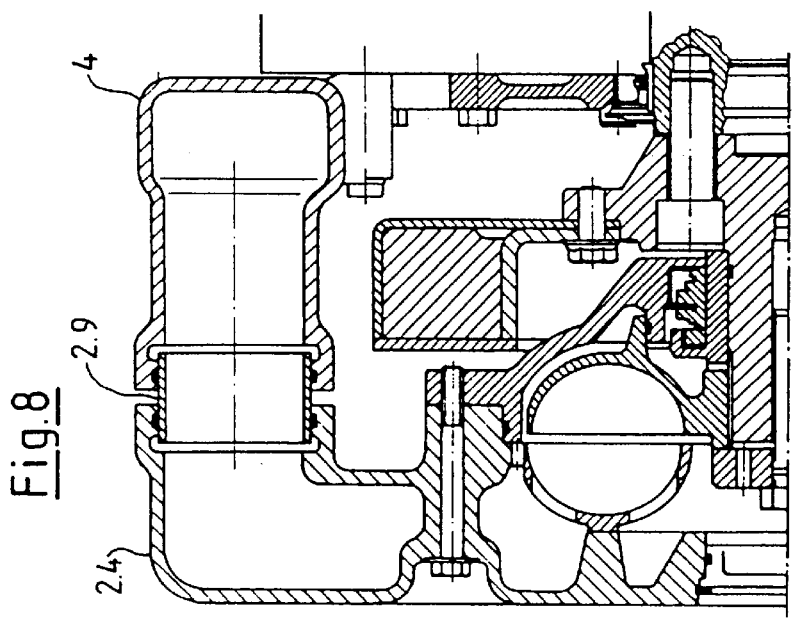
FIG. 8 is a detailed enlargement of a portion of FIG. 1.

FIGS. 7 and 8 are cross-sectional views showing intermediate body 4, duct 4.4, cover body 2.4 and slip-on joints 2.9 which also serve as ports.

Figure 9:
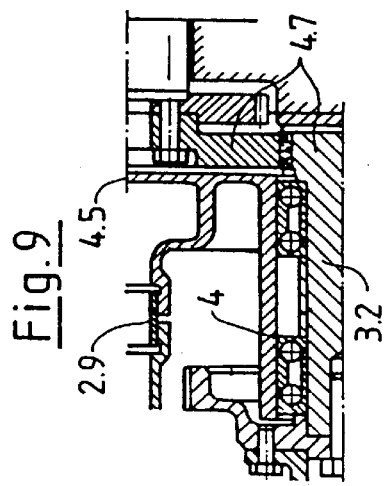
FIG. 9 is a detailed enlargement of a portion of FIG. 1.

FIG. 9 is a cross-sectional view which illustrates a housing part 4.5 which serves as a gearset boundary, drive gears 4.7 for driving fan 3, fan shaft 3.2 and slip-on joint 2.9.

What is claimed is:

1. A drive unit for a motor vehicle, said drive unit comprising;

an internal combustion engine including a crankcase, an engine shaft having a coaxial crankshaft journal, and a crankshaft bearing providing support for said engine shaft at said crankshaft journal;

a cooling system including a fan wheel and a fan shaft, a radially outermost portion of said fan wheel defining a fan wheel fly circle; and a hydrodynamic retarder including a stator, a rotor and a housing, said rotor being mounted on an extending portion of said engine shaft, said extending portion being cantileveredly supported by said crankshaft bearing whereby said hydrodynamic retarder does not include a bearing for supporting said extending portion; and wherein said retarder is substantially disposed within a space bounded on one side by the crankcase, on a second side by the fan shaft, on a third side by the fan wheel, and on a fourth side by a projection of said fan wheel fly circle, said projection being parallel to an axis of said fan wheel.

\* \* \* \* \*